United States Patent [11] 3,624,031

[72] Inventors Hidehiko Kobayashi
 Tokyo;
 Hiroshi Komoto, Saitama-ken; Masatsugu Yoshino, Saitama-ken, all of Japan
[21] Appl. No. 786,471
[22] Filed Dec. 23, 1968
[45] Patented Nov. 30, 1971
[73] Assignee Asahikasei Kogyo Kabushiki Kaisha
 Osaka, Japan
[32] Priorities Dec. 27, 1967
[33] Japan
[31] 42/83210
 Apr. 12, 1968, Japan, No. 43/24189

[54] PROCESS FOR PRODUCING A POLYETHYLENE-1,2-DIPHENOXYETHANE-4,4'-DICARBOXYLATE
4 Claims, No Drawings

[52] U.S. Cl. ................................................. 260/47 C,
 260/40 R, 260/45.7 P, 260/473 G, 260/475 P,
 260/606.5 B
[51] Int. Cl. ........................................................ C08g 17/013,
 C08g 17/015
[50] Field of Search ............................................ 260/47 C,
 475 P, 473 G

[56] References Cited
UNITED STATES PATENTS

| | | | |
|---|---|---|---|
| 2,465,150 | 3/1949 | Dickson | 260/47 (C) UX |
| 2,503,251 | 4/1950 | Edwards et al. | 260/47 (C) UX |
| 3,055,870 | 4/1962 | McIntyre et al. | 260/75 |
| 3,117,950 | 1/1964 | Kibler et al. | 260/75 |
| 3,432,467 | 3/1969 | Davies et al. | 260/75 (N) X |

FOREIGN PATENTS

| | | | |
|---|---|---|---|
| 577,788 | 6/1959 | Canada | 260/75 UX |
| 1,549,430 | 11/1968 | France | 260/47 C |
| 579,462 | 8/1946 | Great Britain | 260/47 C |
| 1,046,069 | 10/1966 | Great Britain | 260/47 C |

OTHER REFERENCES
Korshak Polyesters, published, New York, N.Y., 1965, Pergamon Press, QD341E7K63 pp. 153 & 154

Korshak Polyesters, published, New York, N.Y., 1965, Pergamon Press, pp. 34, 65– 67, 143, 149 & 151

Primary Examiner—William M. Short
Assistant Examiner—Louise P. Quast
Attorney—Waters, Roditi, Schwartz and Nissen ABSTRACT: A linear polyethylene-1,2-diphenoxylethane-4,4'-dicarboxylate having a favorable heat-stability, whiteness and a high crystallization velocity capable of being die molded in a short time like "Delrin" is produced by reacting a 1,2-bis-para-carboalkoxy-phenoxyethane having an acid value of 0.03 or less with ethylene glycol in the presence of an ester interchange catalyst, such as a strontium or barium salt of mono-carboxylic acid having one to four carbon atoms or an orthoborate compound of the formula:
$Sr[B(OCH_2CH_2OH)(OR_3''')]_2$ or
$Ba[B(OCH_2CH_2OH)(OR_3''')]_2$
wherein $R'''$ is selected from the group consisting of cyclohexyl, phenyl, cresyl and diphenyl, until methanol or longer evolves, and subsequently continuing the reaction until the desired degree of polymerization is attained at an elevated temperature under a reduced pressure in the presence of, as a polycondensation catalyst, an organotin compound having the formula
$R_m Sn X_{(4-m/P)}$
wherein R is an aliphatic radical having one to four carbon atoms, a 3- to 6-membered alicyclic radical or an aromatic radical, X represents $-R, -OR, -OH, SnR_3$

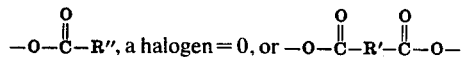

(in which R' represents a di-valent aliphatic radical having one to four carbon atoms, or a di-valent aromatic radical and R" is an aliphatic radical of one to four carbon atoms), $m$ is an integer of one to four, P represents a numerical valence of the X radical and (4—m/P) is an integer of zero to three. A molded article obtained from said polymer has favorable mechanical properties, particularly a high Rockwell Hardness. Further, fibers obtained from said polymer possess a favorable tenacity, elongation, elastic recovery, boil shrinkage and maximum heat shrinkage stress.

PROCESS FOR PRODUCING A POLYETHYLENE-1,2-DIPHENOXYETHANE-4,4'-DICARBOXYLATE

The present invention relates to a process for producing a straight chain polyethylene-1,2-diphenoxy-ethane-4,4'-dicarboxylate which comprises at least 85 percent by weight or more of repeating units in a molecular chain having the structure of

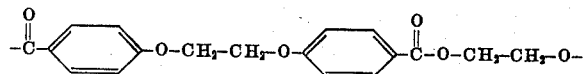

More particularly, the present invention relates to a process for producing a straight chain polyethylene-1,2-diphenoxyethane-4,4'-dicarboxylate having a favorable heat-stability, whiteness and a high crystallization velocity, which comprises effecting an ester interchange reaction and subsequent polycondensation reaction of 1,2-bis-para-carboalkoxy-phenoxyethane with ethylene glycol in the presence of a combined catalyst capable of producing said polymer. Even more particularly, the present invention relates to a process for producing a straight chain polyethylene-1,2 -diphenoxyethane-4,4'-dicarboxylate, which comprises effecting an ester interchange reaction of 1,2-bis-para-carboalkoxy-phenoxyethane with ethylene glycol in the presence of a specific barium or strontium compound as an ester interchange catalyst, and subsequently subjecting the resultant reaction product to a polycondensation reaction in the presence of a specific organotin compound as a polycondensation catalyst. Polymer thus obtained is characterized in that a crystallization velocity is markedly high as compared with those of products prepared in accordance with the prior known processes and that an isothermal crystallization half-life time at 222° C. is 1'35" or less.

It has been known that a molded article of polyethylene-1,2-diphenoxyethane-4,4'-dicarboxylate has a high initial Young's modulus, excellent alkali resistant hydrolyzing characteristic and favorable dimensional stability as compared with that of polyethylene terephthalate. However, such molded article has longer molding interval than *Delrin* (Trade name of polyoxymethylene manufactured by du Pont).

Further, in a field of synthetic fibers, only the fiber has been obtained therefrom which had a low boil shrinkage of 2 percent or less, an extremely small heat shrinkage stress and a bad elastic recovery. These fibers have not been preferred in general for use as cloths due to drawbacks such as ruffled appearance of cloths, a bad crease proofness and so on.

Furthermore in a field of films, transparent and tough films have been produced therefrom by a biaxial stretching. However, in the detailed investigation of physical properties thereof, it has been found that these films have drawbacks such as a large residual elongation, small strength and insufficient dimensional stability. To overcome these drawbacks, a contrivance was made by applying a uniaxial stretching process to said film. However, an application of hot-stretching to a suddenly cooled unstretched film only resulted in an insufficient strength in transverse direction and a readiness in fibrillation by heating.

Originally, in fields of synthetic fibers, films and resins, excellencies in mechanical strength and other physical properties are not all for a requirement for the molded article, but superior whiteness and heat-stability should be provided. These specific properties have been particularly required in the fields of synthetic fibers and films.

On the other hand, it has been known from the specification of U.S. Pat. No. 2,720,507 that a high molecular weight polymer is produced by an ester interchange reaction and a subsequent polycondensation reaction from a low alkyl ester of an aromatic dibasic acid and glycol in the presence of an organotin compound as a catalyst for both the reactions. However, said process has been unable to apply with a favorable result to the production of polymer which is intended by the present invention. In particular, the polymer obtained in accordance with said process has brought about a low melting point, marked coloring and low crystallization velocity thereto.

The object of the present invention is to provide a straight chain polyethylene-1,2-diphenoxyethane-4,4'-dicarboxylate having a favorable heat-stability, whiteness and a high crystallization velocity, which comprises at least 85 percent by weight or more of repeating units in a molecular chain having the structure of

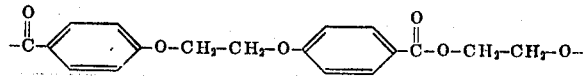

Another object of the present invention is to provide a process for producing a straight chain polyethylene-1,2-diphenoxyethane-4,4'-dicarboxylate, which comprises effecting an ester interchange reaction of 1,2-bis-para-carboalkoxy-phenoxyethane with ethylene glycol in the presence of a specific barium or strontium compound as a ester interchange catalyst, and subsequently subjecting the resultant reaction product to a polycondensation reaction in the presence of a specific organotin compound as a polycondensation catalyst, said produced polymer being characterized in that a crystallization velocity is markedly high as compared with those of products prepared in accordance with the prior known processes and that an isothermal crystallization half-life time at 222° C. is 1 foot 35 inches or less.

These and other objects of the present invention will become apparent to those skilled in the art from a consideration of the following specification and claim.

In accordance with the present invention, it has been found that polyethylene-1,2-diphenoxyethane-4,4'-dicarboxylate is produced by subjecting 1,2-bis-para-carboalkoxy-phenoxyethane and ethylene glycol to an ester interchange reaction in the presence, as a ester interchange catalyst, of a specific barium or strontium salt soluble in the reaction mixture and subsequently the resultant reaction product to a polycondensation reaction in an addition just before said polycondensation, as a polycondensation catalyst, of a specific organotin compound.

The polyethylene-1,2-diphenoxyethane-4,4'-dicarboxylate obtained in accordance with the present invention is characterized by having a favorable heat-stability, whiteness and a high crystallization velocity.

The ester interchange catalyst used for attaining sufficient effects in the practice of the present invention includes a strontium salt and a barium salt of a monocarboxylic acid having one to four carbon atoms such as acetic acid, propionic acid, butyric acid and the like as well as a strontium salt and a barium salt of an orthoborate. Salts of the other metals such as manganese, lead, calcium, magnesium and the like or an organotin compound cannot be used as the ester interchange catalyst in the present invention, since the polymer to be produced by the subsequent polycondensation reaction in the presence of the specific organotin compound is poor in the heat-stability and low in the crystallization velocity.

Said orthoborates used in the form of strontium salt or barium salt as the ester interchange catalyst in the present invention include an ester of boric acid having an aliphatic or aromatic radical, such as ortho-cyclohexylborate, ortho-phenylborate, ortho-cresylborate, ortho-diphenylborate and the like. Said orthoborate compound has the formula

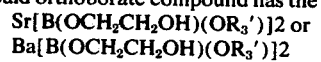

wherein R''' is selected from the group consisting of cyclohexyl, phenyl, cresyl and diphenyl. The strontium or barium salts of said orthoborates are prepared by heating with stirring a glycolate of strontium or barium and the foregoing orthoborate at a molar ratio of 1:2 respectively in an inert solvent such as toluene, xylene, dioxane and the like or in ethylene glycol at a temperature of 150° to 250° C. for 1 to 2 hours. Said ester interchange catalyst is used in an amount of 0.005 to 0.5 percent by weight, preferably 0.01 to 0.2 percent by weight, based on a polymer to be produced.

The organotin compounds used in effecting the present invention are represented by the formula:

wherein R is an aliphatic radical having one to four carbon atoms, a 3- to 6-membered alicyclic radical or an aromatic radical, X is —R, —OR, —OH, —SnR₃,

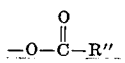

a halogen, =O or

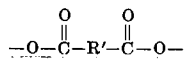

wherein R is as defined above, R'' is an aliphatic radical of one to four carbon atoms and R' is a valent aromatic radical; m is an integer of one to four, P is integer of zero to three.

The following are representative examples of said organotim compounds usable in the present invention:

1. R₄Sn
Tetra-methyl-tin, tetra-cyclohexyl-tin,
tetra-phenyl-tin,

2. R_mSn_m(OR)₄₋m
Butoxy-tributyl-tin, dibutyl-dibutoxy-tin,
diphenyl-dimethoxy-tin, 3. R₃Sn:SnR₃
Hexamethyl-ditin, hexacyclohexyl-ditin, 4. R₃Sn OH
Trimethyl-tin-hydroxide, tricyclohexyl-tin-hydroxide, tritolyl-tin-hydroxide, 5. R₂SnO
Dibutyl-tin-oxide, dicyclohexyl-tin-oxide, dinaphthyl-tin-oxide, (6) $R_mSn-(O-\overset{O}{\overset{\|}{C}}-R'')_{4-m}$ Trimethyl-tin-acetate, tricyclohexyl-tin-acetate, dibutyl-tin-acetate, 7. R_mSnY₄₋m (Y is a halogen.)
Dibutyl-tin-dichloride, dibutyl-tin-dibromide, (8) 
$$R_2Sn-O-\overset{O}{\overset{\|}{C}}$$
$$\quad\;\; |$$
$$\;\; O-C-R'$$
$$\qquad \overset{\|}{O}$$

Diphenyl-tin-maleate dimethyl-tin-phthalate

Said organotin compounds are used in an amount of 0.005 to 0.1 percent by weight, preferably 0.01 to 0.05 percent by weight, based on polymer to be produced.

The 1,2-bis-para-carbomethoxy-phenoxyethane used in the present invention should be that having an acid value of 0.03 or less. The acid value is measured by titrating with 0.1N or KOH and phenol phthalein an acid component of the solution which is prepared by dissolving with heating 1 g. of 1,2-bis-para-carboalkoxy-phenoxy-ethane in 100 g. of ethyl alcohol. Such acid value cannot be attained satisfactorily by only a few rounds of recrystallization from solvent, for instance, recrystallized from toluene which is ordinarily used. A number of rounds of recrystallization is required to obtain such high purity as 0.03 or less acid value. If the acid value is more than 0.03, the polymer obtained is poor in heat-stability. The reason of said result is not clear, but a cause thereof may be a mixing of a slight amount of impurities at the time when 1,2-bis-para-carboalkoxy-phenoxyethane is produced. The purification by distillation of 1,2-bis-para-carboalkoxy-phenoxyethane can also be effected in an usually known manner. In preferable, by carrying out the distillation in an addition in the order of 0.01 to 0.1 percent by weight, based on the above 1,2-bis-para-carboxyalkoxy-phenoxyethane, of a manganese, calcium, magnesium or sodium salt of phosphoric acid, phosphorous acid or the like, an oxide such as manganese oxide, calcium oxide, magnesium oxide, sodium oxide or the like, or a metal such as manganese, calcium, magnesium, sodium or the like, the distillate therefrom is improved in the whiteness and lowered in the acid value.

The ester interchange reaction in the present invention is carried out by adding to the 1,2-bis-para-carboalkoxy-phenoxyethane purified in accordance with the foregoing procedures 1.3 to 5.0 mole times of ethylene glycol. The resultant mixture is heated at a temperature in the range of 150° to 240° C. until methanol no longer evolutes.

The polycondensation reaction in the present invention is effected by heating the reaction product obtained in the above ester interchange reaction at a temperature in the range of 240° to 300° C., preferably in the range of 260° to 280° C., under a reduced pressure of 10 mm. Hg. or less with evolution of the ethylene glycol. In the course of the polycondensation reaction, titan oxide as a flatting agent and a phosphorus compound such as phosphoric acid, phosphorous acid, triphenyl phosphite and the like as a coloring stabilizer may be added.

The polymer produced in accordance with the present invention can be molded in a die at a low temperature less than 70° C. The resultant molded article shows excellencies in quality, stability and mechanical properties, in particular in Rockwell Hardness. Further, an use of the present polymer makes it possible to shorten the molding interval in a die molding. For instance, it is possible to carry out the molding in a

TABLE I.—ISOTHERMAL CRYSTALLIZATION HALF-LIFE TIME

| Number | Catalyst | | Pre-determined constant temperature, ° C. | | |
|---|---|---|---|---|---|
| | Ester interchange | Polycondensation | 222 | 227 | 232 |
| Example: | | | | | |
| 1 | Sr (OAc)₂ | Bu₂SnO | 1′30″ | 3′23″ | |
| 2 | Ba(OAc)₂ | Bu₂Sn(OMe)₂ | 1′34″ | 3′21″ | 10′00″ |
| 3 | Sr(OAc)₂ | Bu₂SnO | 1′32″ | 3′30″ | |
| 4 | Sr(OAc)₂ | Me₃Sn(OH) | 1′32″ | 3′27″ | 10′03″ |
| 5 | Ba(OAc)₂ | Bu₂Sn(OAc)₂ | 1′30″ | 3′20″ | |
| 6 | Sr[B(OCH₂CH₂OH)(O-⟨H⟩)₃]₂  | Bu₂SnO | 1′27″ | 3′10″ | 10′00″ |
| 7 | Ba[B(OCH₂CH₂OH)(O-⟨⟩)₃]₂ | Bu₂Sn(OMe)₂ | 1′20″ | 3′05″ | |
| 8 | Sr[B(OCH₂CH₂OH)(O-⟨H⟩)₃]₂  | Bu₂(OAc)₂ | 1′10″ | 3′08″ | |
| Comparative Example 1 | Ca(OAc)₂ | Bu₂SnO | 4′33″ | 10′57″ | |
| | Zn(OAc)₂ | Sb₂O₃ | 3′15″ | 5′48″ | |
| | Mn(OAc)₂ | Sb₂O₃ | 2′32″ | 7′39″ | 16′00″ |
| | Pb(OAc)₂ | Sb₂O₃ | 3′39″ | 6′48″ | 19′00″ |
| | Mn(OAc)₂ | Bu₂SnO | 6′32″ | 15′21″ | 50′21″ |
| Reference Experiment: | | | | | |
| 1 | Zn(OAc)₂ | | 6′35″ | 17′22″ | 51′35″ |
| 2 | Bu₂SnO | | 8′25″ | 18′35″ | 59-23″ |

Note.—Ac=OCCH₃, Bu=C₄H₉—, Me=—CH₃.

time as long as that of Delrin.

As the result of measuring the crystallization velocity of the polymer capable of giving such favorable molded article, the present inventors have found that an isothermal crystallization half-life time of the polymer is 1'35" or less at 222° C.

The isothermal crystallization half-life time referred to herein and throughout the present specification shows the crystallization velocity and is defined as time required until the half of a whole crystallization amount is crystallized when a polymer is completely melt in a cell of differential scanning calorimeter (Perkin Elmer, DSC–1 B) at 300° C. for 5 minutes, then the temperature is lowered to a predetermined constant temperature, for example 222° C., at a velocity of 64° C./min.

Table I shows variations in isothermal crystallization half-life time of polymers obtained by various combinations of catalysts used.

lization velocity appears. A value of the reduced viscosity of the polymer favorable in a processability and excellent in a mechanical strength required for an ordinary molded article is in the range of 0.7 to 1.0, whereby a favorable crystallization velocity as shown in Table I is given.

Fibers obtained by spin take up method using the polymer produced in accordance with the present invention show a favorable tenacity, elongation, elastic recovery, boil shrinkage and maximum heat shrinkage stress even at a reeling velocity of 2000 m./min. Further, by usual spinning and stretching method, fibers having high elastic recovery, boil shrinkage and maximum heat shrinkage stress can also be obtained.

Table III shows a relation of boil shrinkage, elastic recovery and maximum heat shrinkage stress. The sample was prepared by spinning a polymer at a spinning temperature of 295° C., at an extruding linear velocity of 17 m./min. and at a reeling velocity of 1000 m./min., and hot-stretching the resultant un-

TABLE II

| | Ester interchange catalyst | Percent by weight | Polycondensation catalyst | Percent by weight | Reduced viscosity $\eta sp/c$ | Isothermal crystallization half life time at 222° C. | Rockwell Hardness (M scale) | Molding interval (second) |
| --- | --- | --- | --- | --- | --- | --- | --- | --- |
| Example: | | | | | | | | |
| 1 | Sr(OAc)$_2$ | 0.08 | Bu$_2$SnO | 0.03 | 0.717 | 1'30" | 101 | 65 |
| 2 | Ba(OAc)$_2$ | 0.09 | Bu$_2$Sn(OMe)$_2$ | 0.03 | 0.949 | 1'34" | 100 | 65 |
| Comparative Example 1 | Zn(OAc)$_2$ | 0.03 | Sb$_2$O$_3$ | 0.03 | 0.827 | 3'15" | 91 | 130 |
| | Ca(OAc)$_2$ | 0.06 | GeO$_2$ | 0.01 | 0.892 | 7'18" | 89 | 120 |
| Reference Experiment | Mg(OAc)$_2$ | 0.05 | Sb$_2$O$_3$ | 0.03 | 0.825 | 2'12" | 92 | 100 |
| | Ba(OAc)$_2$ | 0.09 | GeO$_2$ | 0.01 | 0.923 | 1'48" | 92 | 80 |
| | Mn(OAc)$_2$ | 0.04 | Bu$_2$SnO | 0.03 | 0.668 | 5'20" | 90 | 130 |

TABLE III

| Boil | Elastic recovery when elongated by 5% | Maximum heat shrinkage stress |
| --- | --- | --- |
| shrinkage (%) | (%) | (g./cm.$^2$×10$^{-5}$) |
| Example 1 | 6.0 | 90 | 7.8 |
| Example 2 | 4.2 | 90 | 7.6 |
| Comparative Example 1 | 1.3 | 43 | 1.6 |
| Reference Experiment | 1.2 | 40 | 1.4 |
| | 1.5 | 42 | 1.6 |
| | 2.3 | 63 | 2.8 |

Table II shows a relation between an isothermal crystallization half-life time at 222° C. of polymers produced in the presence of various combinations of catalysts and Rockwell Hardnesses or resins molded in a die at 70° C.

Said molding was carried out by extruding a polymer by means of a screw type extruder at a cylinder temperature of 270° C. under a pressure of 500 kg./cm.$^2$ for an injection time of 20 seconds to a die heated at 70° C. A time required for one cycle inclusive of enough cooling time to complete the crystallization was shown as molding interval in table II. A viscosity of polymer referred to in said table II shows a reduced viscosity at 35° C. of 1 percent solution of the polymer in a mixed solvent of tetra-chloroethane and phenol at a ratio by weight of 3:1 respectively.

It has been found from table II that the polymer having a higher crystallization velocity in the range less than 1'35" of the crystallization half-life time at 222° C. possesses a short molding interval and favorable mechanical properties.

The reduced viscosity of the polymer produced in accordance with the present invention may be of a value more than that required at a processing of an ordinary molding. In the case where the reduced viscosity is 0.6 or less, the crystallization velocity becomes higher than those of values of the polymers produced in accordance with the present invention listed in table I, which results in a decrease in a mechanical strength of molded article obtained. When the reduced viscosity becomes to be 0.6 or more, a decrease in the crystalstretched filament by 3 times at 140° C. The heat shrinkage stress was measured in air at 20° C. under no tension at a temperature rising velocity of 1° C./min. in accordance with the method of Dr. Kamide [Journal of Fiber Institute, 22, 249 (1966)]. The elastic recovery when elongated was measured by elongating the sample to a definite elongation (for example, 5 percent) at an elongation velocity of 10 percent/min., and after holding the elongated sample for one minute, recovering towards the original state at the same rate as in the elongation. Said elongation and recovery were measured along an axis of elongation. The polymers used were those listed in table II.

A tough film or tape which can not be fibrillated can be produced by extruding the polymer obtained in accordance with the present invention in a molten state to a film or tape, passing the resultant film or tape without a sudden cooling through a zone heated at 60° to 150° C. to set a crystallization degree defined from a density of unstretched film or tape at 7 to 35 percent, and then stretching uniaxially the resultant film or tape.

The following examples are given as illustrative of the present invention and are not to be considered as limiting. The viscosity of the polymer in the examples is shown in the reduced viscosity ($\eta sp./c.$) at 35+ C. of 0.5 percent solution of the polymer in a mixed solvent of phenol and tetrachloroethane at a ratio by weight of 1:3 and parts are by weight unless otherwise specified.

EXAMPLE 1

1,2-bis-para-carbomethoxy-phenoxyethane is purified by adding 0.1 part of manganese phosphate to 100 parts of a crude 1,2-bis-para-carbomethoxy-phenoxyethane and subjecting the resultant mixture to a purification by distillation at 230° C. under a reduced pressure of 1 mm. Hg. to solidify. To 100 parts of purified product was added 75 parts of ethylene glycol and 0.09 part of strontium acetate as an ester interchange catalyst, and subjected to an ester interchange reaction at 220° C. for 4 hours with evolution of methanol. Then to the resultant reaction product was added 0.1 part of triphenylphosphite as a coloring stabilizer and 0.03 part of (C$_4$H$_9$)$_2$ SnO as a polycondensation catalyst, and heated at 280° C. for 3 hours under a reduced pressure of 0.1 mm. Hg. or less with evolution of ethylene glycol. The resultant polymer was a solid having a reduced viscosity of 0.717, a whiteness of class five and a melting point of 250 ° C. Said polymer was not colored even heated in air at 240° C. for 3 hours.

EXAMPLE 2

100 Parts of crude 1,2-bis-para-carbomethoxy-phenoxyethane subjected to a purification by distillation by the addition of 0.1 part of sodium metal and 80 parts of ethylene glycol were charged to an ester interchange vessel. 0.09 Part of barium acetate as an ester interchange catalyst was added thereto and heated at 220° C. for 4 hours with evolution of methanol. Then the resultant reaction product was transferred to a polycondensation vessel. 0.1 Part of tripheny phosphite as a stabilizer and 0.03 part of dibutyl-tin-dimethoxide were added thereto and heated at 280° C. under a reduced pressure of 0.1 mm.Hg or less with evolution of ethylene glycol. The resultant polymer was a solid having a reduced viscosity of 0.949, a melting point of 249° C. and a whiteness of class 5, and was not colored even heated in air at 240° C. for 3 hours.

COMPARATIVE EXAMPLE 1

Polymerizations were carried out in the same manner as in Example 1 but using calcium, manganese, magnesium, lead or zinc acetate as an ester interchange catalyst and $Bu_2SnO$ or $Sb_2O_3$ as a polycondensation catalyst. The results are shown in table IV.

TABLE IV.—A RELATION BETWEEN AN ESTER INTERCHANGE-POLYCONDENSATION CATALYST COMBINATION AND A HEAT-COLOURING

| Polycondensation catalyst | | Ester interchange catalyst | | | | | | |
| --- | --- | --- | --- | --- | --- | --- | --- | --- |
| | | $Ca(OAc)_2$ (0.06) | $Mn(OAc)_2$ (0.04) | $Mg(OAc)_2$ (0.07) | $Pb(OAc)_2$ (0.04) | $Zn(OAc)_2$ (0.03) | $Ba(OAc)_2$ (0.09) | $Sr(OAc)_2$ (0.08) |
| $Sb_2O_3$(0.03) | $\eta/c$ | 0.784 | 1.037 | 0.825 | 0.825 | 0.827 | 0.854 | 0.934. |
| | Transparency | Good | Good | Good | Good | Good | Ordinary | Good. |
| | Heat-colouring | XX | XX | XX | XX | XX | XX | XX. |
| | Tm | 249 | 245 | 248 | 248 | 246 | 249 | 259. |
| | Whiteness | 3 | 3 | 3 | 3 | 3 | 3 | 3. |
| $Bu_2SnO$(0.03) | $\eta/c$ | 0.748 | 0.668 | 0.867 | 0.724 | 0.892 | 0.949 | 0.717. |
| | Transparency | Good | Good | Good | Good | Good | Good | Good. |
| | Heat-colouring | ○ | ○ | XX | XX | XX | ◎ | ◎. |
| | Tm | 250.5 | 248 | 248 | 245 | 246 | 249 | 250. |
| | Whiteness | 4 | 4 | 4 | 3 | 3 | 5 | 5. |

The transparency was determined "bad" for a polymer where there was a cloud in a breaker plate after spun, while "good" for a polymer where there was utterly no cloud therein.

The heat-coloring was determined as

◎ for a polymer where there was utterly no change in color when heated in air at 240° C. for 3 hours, as xx for a polymer where there was a coloring and as

○ for a polymer where there was a slight coloring.

The melting point (Tm) was determined by DSC. The Tm was represented by a center position of an endothermic peak when a temperature of dry crystallized sample was raised in a cell at a velocity of 16° C./min.

The whiteness was classified to 1 to 5 classes, that is, class 5 was a complete white, class 4 very slightly yellow, class 3 slightly yellow, class 2 yellow and class 1 concentrated yellow.

COMPARATIVE EXAMPLE 2

Reactions were effected in the same manner as in example 1 but using 1,2-bis-para-carbomethoxy-phenoxyethane which had an acid value of 0.08 and was twice recrystallized from toluene. There was obtained a solid having a whiteness of class 4, a bad transparency and a melting point of 248° C. A heat-coloring was xx.

EXAMPLE 3

Reactions were effected in the same manner as in Example 1 but using 1,2-bis-para-carbomethoxy-phenoxyethane which had an acid value of 0.02 after 10 rounds of recrystallization from toluene. There was obtained a white solid having a whiteness of class 5, a good transparency and a melting point of 249° C. No coloring took place even heated at 240° C. for 3 hours.

EXAMPLE 4

Reaction was effected in the same manner as in example 1 but replacing dibutyl-tin-oxide with trimethyl-tin-hydroxide. There was obtained a white solid having a whiteness of class 5, a good transparency and a melting point of 248° C. No coloring took place even heated at 240° C. for 3 hours.

EXAMPLE 5

Reaction was effected in the same manner as in example 2 but replacing dibutyl-tin-dimethoxide with 0.02 part of dibutyl-tin-acetate. There was obtained a white solid having a whiteness of class 4, a good transparency and a melting point of 248° C. No coloring took place even heated in air at 240° C. for 3 hours.

EXAMPLE 6

Reactions were effected in the same manner as in example 1 but replacing strontium acetate with 0.2 part of strontium salt of ortho-cyclohexylborate

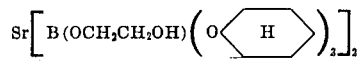

There was obtained a solid having a melting point of 250° C., a $\eta sp./c.$ of 0.798 and a whiteness of class 5. No coloring took place even heated in air at 240° C. for 3 hours.

EXAMPLE 7

Reactions were effected in the same manner as in Example 2 but replacing barium acetate with 0.25 part of barium salt of ortho-phenylborate

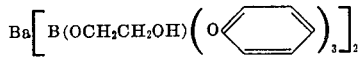

. There was obtained a solid having a melting point of 249° C., a $\eta sp./c.$ of 0.825 and a whiteness of class 5. No coloring took place even heated in air at 240° C. for 3 hours.

COMPARATIVE EXAMPLE 3

Reactions were effected in the same manner as in example 7 but using 1,2bis-para-carbomethoxy-phenoxyethane which had an acid value of 0.08 and was recrystallized from toluene. There was obtained a solid having a whiteness of class 4, a bid transparency and a melting point of 249° C. A heat coloring was xx.

EXAMPLE 8

Reactions were effected in the same manner as in example 6 but replacing dibutyl-tin-oxide with dibutyl-tin-diacetate. There was obtained a white solid having a ηsp./c. of 0.982, a whiteness of class 5, a good transparency and a melting point of 249° C. A heat-coloring was

EXAMPLE 9

Reactions were effected in the same manner as in example 7, but replacing dibutyl-tin-methoxide with trialkyl-tin-hydroxide. There was obtained a white solid having a ηsp./c. of 0.932, a whiteness of class 5, a good transparency and a melting point of 250° C. A heat-coloring was

EXAMPLE 10

The polymer obtained in accordance with example 9 was extruded at 310° C. at an extruding velocity of 0.5 g./min. and was reeled at a velocity of 2000 m./min. The resultant fibers had a tenacity of 3.5 g./d., an elongation of 56.4 percent, an index of refraction $\Delta n= 0.161$, a density of 1.363 g./cm.$^3$, a boil shrinkage of 3.5 percent and a maximum heat shrinkage stress of 7.5 g./cm.$^2 \times 10^{-5}$.

EXAMPLE 11

The polymer obtained in accordance with example 2 was extruded into air zone heated at 110° C. by an extruder having a dieround of 40 mm. in diameter, a dieslit of 350 mm. long and 0.5 mm. wide at a die temperature of 280° C., and reeled at a reeling velocity of 5 m./min. to prepare an unstretched film having a thickness of 100 microns and a crystallization degree of 15 percent. Stretching the resultant film by 4.0 times at 120° C, without being cut, there was obtained a film which was not fibrillated and has a yielding strength of 2690 kg./cm.$^2$, an elongation of 6.4 percent, a Young's modulus of 80,000 kg./cm.$^2$ and a heat shrinkage at 180° C. for one minute of 1 percent or less.

EXAMPLE 12

The polymer obtained in accordance with example 2 was extruded by a screw type extruder at a cylinder temperature of 270° C. under an extruding pressure of 500 kg./cm.$^2$ for an injection time of 20 seconds to a die kept at a low temperature of 70° C. A required time for one cycle inclusive of a cooling time of molded article obtained was favorable The molded article had a yielding strength of 820 kg./cm.$^2$, an elongation of 6 percent, a breaking strength of 513 kg./cm.$^2$, a breaking elongation of 22 percent, a modulus of elasticity of 2.57×10$^4$ kg./cm.$^2$, a Rockwell Hardness of 100, a density of 1.35 g./cc., a thermal deformation temperature of 91° C. and a water content of 0.04 percent.

The invention being thus described, it will be obvious that the same way be varied in many ways. Such variation are not to be regarded as a departure from the spirit and scope of the present invention, and all such modifications are intended to be included within the scope of the following claim.

What we claim is:

1. A process for producing a moldable straight chain polyethylene-1,2-diphenoxyethane-4,4'-dicarboxylate having a favorable heat-stability, whiteness and a high crystallization velocity, which comprises reacting a 1,2-bis-para-carboalkoxy-phenoxyethane having an acid value of 0.03 or less with ethylene glycol in the presence of 0.005 to 0.5 percent by weight based on the polymer to be produced of at least one ester interchange catalyst selected from the group consisting of a strontium salt of a monocarboxylic acid having one to four carbon atoms, a barium salt of a monocarboxylic acid having one to four carbon atoms, and an orthoborate compound of the formula $$Sr[B(OCH_2CH_2OH)(OR_3')]2 \text{ or } Ba[B(OCH_2CH_2OH)(OR_3''')]$$

wherein R''' is selected m/p)the group consisting of cyclohexyl, phenyl, cresyl and diphenyl, until methanol no longer evolves, and subsequently subjecting the resultant reaction product to a polycondensation reaction with evolution of ethylene glycol in the presence of 0.005 to 0.1 percent by weight, based on the polymer to be produced of a polycondensation catalyst which is an organotin compound of the formula:

$$R_mSnX_{(4-m/p)}$$

wherein R is an aliphatic radical having one to four carbon atoms, a 3— to 6— membered alicyclic radical or an aromatic radical, X is —R, —OR, —OH, —SnR$_3$,

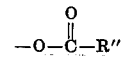

a halogen, = O or

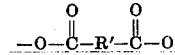

in which R is as defined above, R'' is an aliphatic radical of one to four carbon atoms and R' is a —CH CH— radical or a phenylene radical, m is an integer of one to four, p is the numerical valence of the X radical and (4_m/p) is an integer of zero to three.

2. A process according to claim 1, wherein said ester interchange reaction is effected at a temperature in the range of 150° to 240° C.

3. A process according to claim 1, wherein said polycondensation reaction is effected at a temperature in the range of 240° to 300° C. under a reduced pressure of 10 mm.Hg or less.

4. A process according to claim 1, wherein said monocarboxylic acid having one to four carbon atoms is acetic acid, propionic acid or butyric acid.

* * * * *

UNITED STATES PATENT OFFICE
CERTIFICATE OF CORRECTION

Patent No. 3,624,031  Dated November 30, 1971

Inventor(s) Hidehiko Kobayashi et al

It is certified that error appears in the above-identified patent and that said Letters Patent are hereby corrected as shown below:

On the cover sheet [73] in the assignee's name "Asahikasei" should read -- Asahi Kasei --.

Signed and sealed this 12th day of December 1972.

(SEAL)
Attest:

EDWARD M. FLETCHER, JR.
Attesting Officer

ROBERT GOTTSCHALK
Commissioner of Patents